Jan. 16, 1923.

H. W. CHRISTIAN.
ELECTRIC WATER HEATING APPARATUS.
FILED AUG. 25, 1921.

Inventor
Herbert W. Christian,
By
Attorneys

Jan. 16, 1923.
H. W. CHRISTIAN.
ELECTRIC WATER HEATING APPARATUS.
FILED AUG. 25, 1921.
1,442,048.
2 SHEETS—SHEET 2.
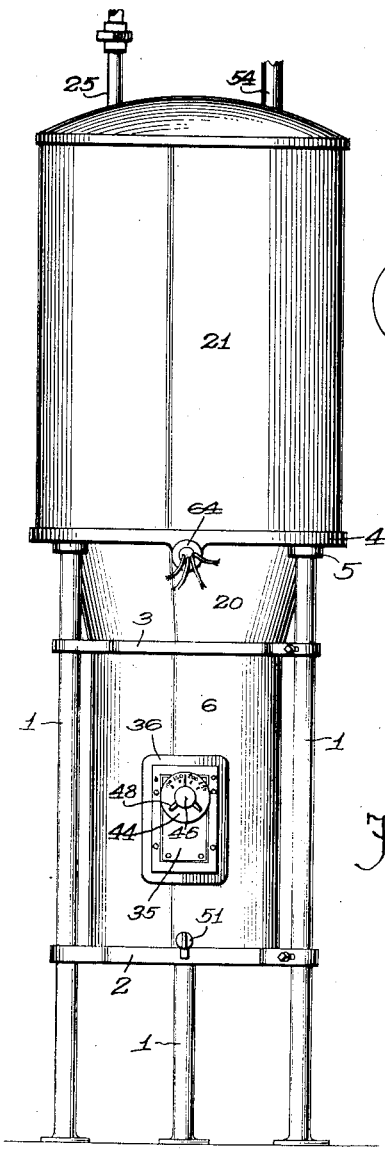
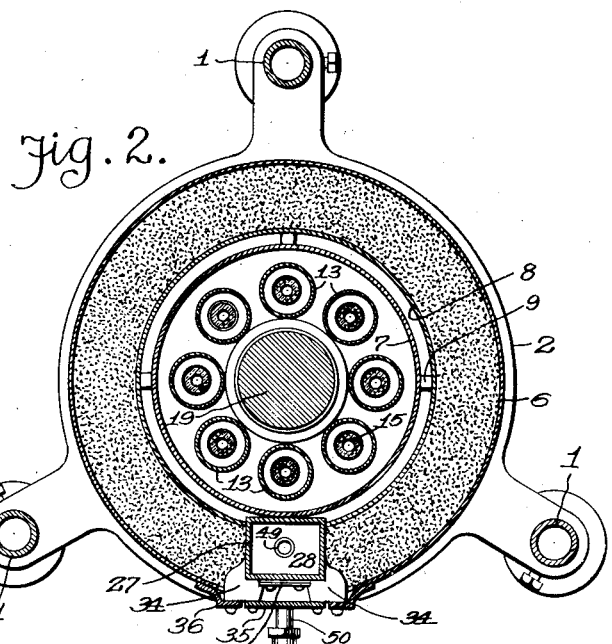
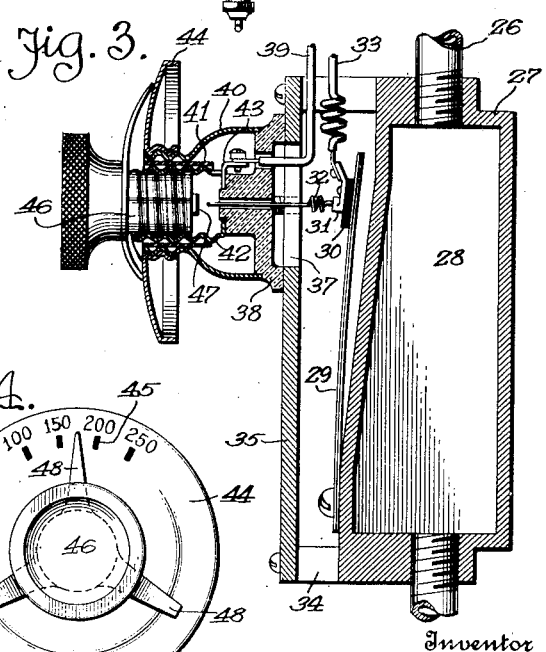
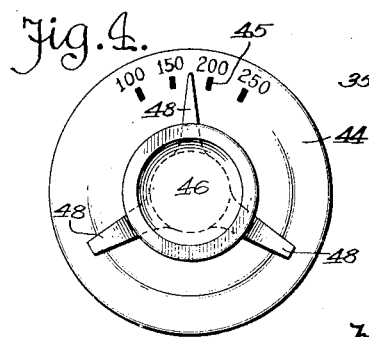
Inventor
Herbert W. Christian,
By
Attorneys Patented Jan. 16, 1923.

1,442,048

UNITED STATES PATENT OFFICE.

HERBERT W. CHRISTIAN, OF DETROIT, MICHIGAN.

ELECTRIC WATER-HEATING APPARATUS.

Application filed August 25, 1921. Serial No. 495,371.

*To all whom it may concern:*

Be it known that I, HERBERT W. CHRISTIAN, a citizen of the United States of America, residing at Detroit, in the county of Wayne and State of Michigan, have invented certain new and useful Improvements in Electric Water-Heating Apparatus, of which the following is a specification, reference being had therein to the accompanying drawings.

This invention relates to an electric water heater and my invention aims to provide a water heating apparatus wherein a plurality of electric heating units are arranged for expeditiously and economically heating water, and provision is made for constantly maintaining a body of warm water so that there will always be an available source of warm water for instant use.

My invention further aims to provide an electric water heating apparatus which is thermostatically controlled and the thermostatic mechanism is such as to be regulated to maintain water at a desired temperature in the heating apparatus.

My invention further aims to provide an electric water heating apparatus embodying a reservoir located so that heated air in the apparatus may be utilized for heating the reservoir and the entire apparatus is thoroughly insulated so as to conserve heat that may be emitted by the heating unit and connections within the apparatus.

The construction entering into my invention will be hereinafter described and then claimed and reference will now be had to the drawings, wherein Figure 1 is a vertical sectional view of the electric water heating apparatus, partly broken away and showing an automatic switch in proximity to the apparatus;

Fig. 2 is a horizontal sectional view taken on the line II—II of Fig. 1;

Fig. 3 is an enlarged vertical sectional view of a thermostat chamber and thermostat forming part of the apparatus;

Fig. 4 is a front elevation of the thermostatic dial, and

Fig. 5 is a front elevation of a complete apparatus on a smaller scale than that shown in Fig. 1.

Figure 1:
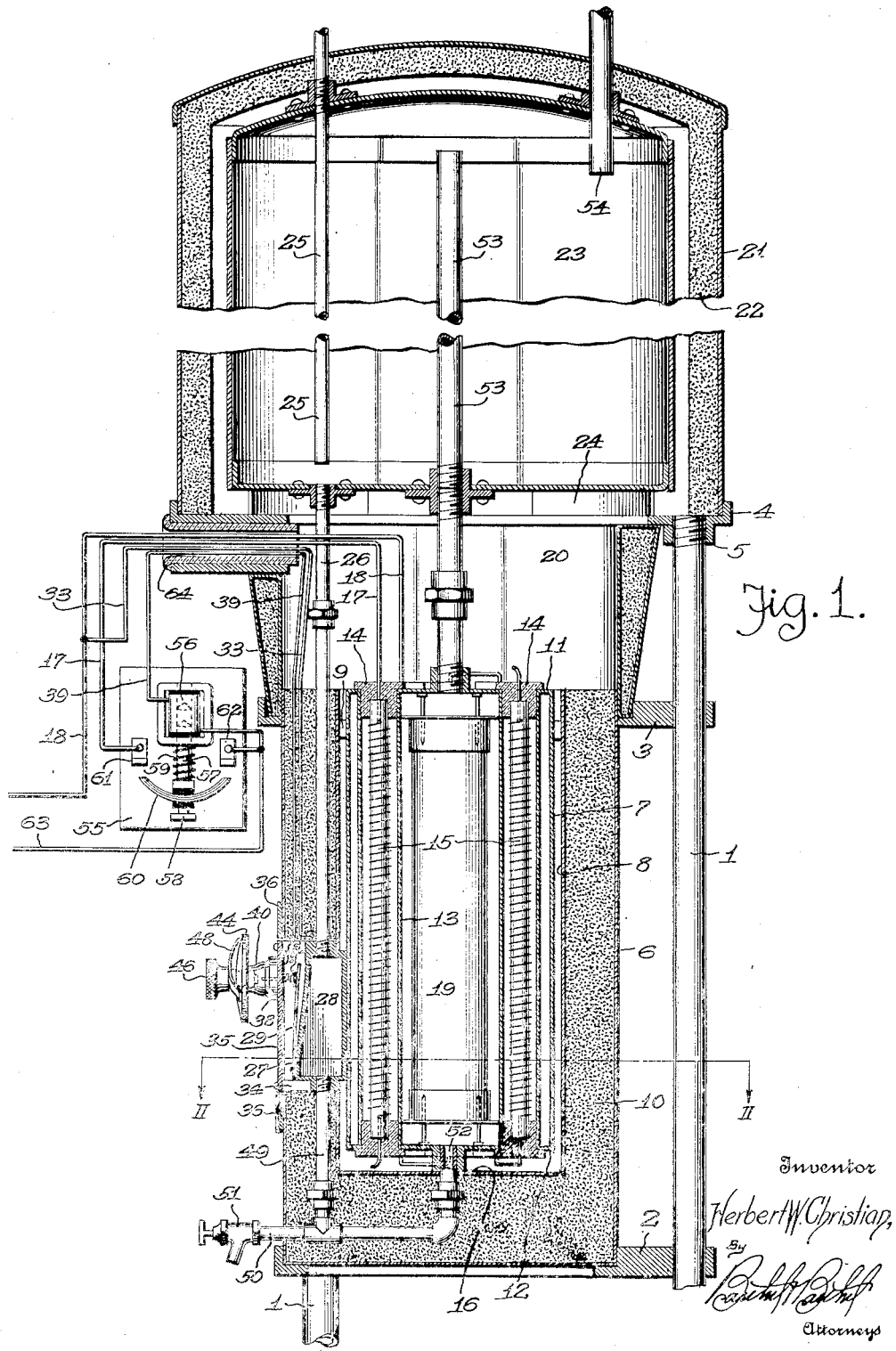

The reference numerals 1 denote a plurality of legs or uprights connected by superposed ring-like platforms 2, 3 and 4, the platforms 2 and 3 having apertured radially disposed lugs to receive the uprights 1 and the lugs may be fixed relative to the uprights by set screws or other fastening means. The lower face of the platform 4 has interiorly screwthreaded sockets 5 to receive the upper ends of the uprights and it is on and between the platforms that the heating apparatus is supported.

6 denotes a cylindrical casing seated on the platform 2 and extending through the platform 3 and in said casing are concentrically disposed inner and outer shells 7 and 8 respectively, said shells being spaced apart by suitable spacer members 9 and the outer shell 8 spaced from the casing 6 by suitable insulation material 10. The inner shell 7 has heads 11 and 12 connected by vertically disposed circumferentially arranged tubes 13, said tubes being arranged in proximity to each other and to the wall of the inner shell. In the ends of the tubes 13 are insulators 14 supporting electric heating elements or units 15 centrally of the tubes. The electric heating elements are of a conventional form, each including a core and resistance coil thereabout, and the lower ends of the heating elements are connected in series between the head 12, of the inner shell and the bottom wall 16 of the outer shell 8. The upper ends of the heating elements are also connected in series and have leading out wires 17 and 18 that will be hereinafter referred to.

Axially of the inner shell 7 is a cylindrical filler member 19 having its ends held in spaced relation to the heads 11 and 12 of the inner shell 7 and this central filler member is adapted to confine water about the tubes 13 so that there will be comparatively small bodies or film like formations of water against the tubes 13 to be heated by conduction therefrom.

Seated on the platform 3 and fitted on the upper end of the casing 6 is an intermediate casing 20 having insulated walls extending to the platform 4 and this casing permits of connections being established between the lower and upper parts of the apparatus, besides affording an air chamber establishing communication between the upper and lower parts of the apparatus.

Mounted on the upper platform 4 is a reservoir casing or shell 21 having a lining 22 of suitable insulation, and in spaced relation to the lining 22 is a reservoir 23 having suitable legs 24 supporting the bottom of the reservoir in spaced relation to the platform 4. The tops of the shell 21 and the reservoir 23 are closed and extended through the tops is a cold water supply pipe 25 having its inner end in proximity to the bottom of the reservoir 23. This cold water supply pipe vertically alines with a pipe 26 connected to the bottom of the reservoir 23, extending through the intermediate casing 20, and through the insulation 10 to a thermostatic housing 27 set in the front side of the casing 6, said housing providing a chamber 28 with its rear portion extending into the outer shell 8 and against the inner shell 7, so that the contents of the chamber 28 may be heated by conduction from the inner shell 7. The front wall of the housing 27 is inclined to provide clearance for a thermostatic member 29 having one end thereof fixed to the housing and the opposite end thereof provided with an insulator 30 for a connector 31 having a yieldable contact member 32 and a leading out wire 33. The housing 27 has upper and lower brackets 34 connected by a front plate 35 and connected to a frame 36 suitably secured to the front wall of the casing 6, so that said casing, frame and the inner shell 7 may all cooperate in retaining the thermostatic housing 27 in place.

The front plate 35 has an opening 37 over which is mounted an insulator 38 through which extends a contact member 32 and a leading out wire 39. Mounted on the insulator 38 is a screw shell 40 containing a sleeve 41 of insulation material and a screw socket 42 which has its inner end connected, as at 43, to the leading out wire 39. Screwed on the shell 40 is a dial 44 provided with temperature indicia and graduations 45.

Screwed into the socket 42 is a screw plug 46 having its inner end provided with a contact member 47 in the path of the contact member 32 carried by the thermostatic member 29, so that expansion and contraction of said member will cause the contact member 32 to be shifted to and from the contact member 47, and since said contact member 47 is adjustable in the socket 42, said contact member may be shifted to and from the contact member 32 to increase or decrease the gap between the contact members and thus regulate the action of the thermostat.

On the screw plug 46 is a resilient spider 48 having one of its arms serving as a pointer or indicator on the dial 44 and the resiliency of the spider causes the threads of the plug 46 to frictionally engage the threads of the socket 42 and by a binding action prevent accidental rotation of the screw plug 46 relative to the socket 42. The binding action, however, does not prohibit adjustment of the screw plug 46 to set said plug for a desired temperature of water within the thermostatic chamber 28 and it is obvious that a very minute temperature regulation may be attained by virtue of the adjustable contact member of the thermostat.

The bottom wall of the thermostatic chamber 28 is connected by a pipe 49 to a drain pipe 50 having a suitable drain cock 51, and said drain pipe is also connected to a bottom drain connection 52 of the inner shell 7, said drain connection resting on the bottom wall 16 of the outer shell 8 to assist in supporting the inner shell relative to the outer shell. By opening the drain cock 51 the chamber 28 and the inner shell 7 may be drained to remove sediment and foreign matter.

Connected to the head 11 of the inner shell 7 is an axial pipe 53 extending through the intermediate casing 20, and through the bottom of the reservoir 23 to a point in proximity to the top of the reservoir so that hot water from within the inner shell 7 may flow through the pipe 53 and into the reservoir 23. Extending through the top of the reservoir and the top of the upper shell 21 is a water outlet pipe 54.

Suitably mounted near or at the heating apparatus is a solenoid switch 55 provided with a solenoid 56 having its core 57 movable to and from a stop 58, and a coiled expansion spring 59 encircles the core 57 and by its expansive force maintains the core normally extended and in engagement with the stop 58. On the core 57 is a yieldable bridge contact member 60 suitably insulated from the core with the insulation interposed between the core and the stop 58. The bridge contact member 60 is adapted to connect contact members 61 and 62, the former being connected to the leading out wires 17, and the latter to a wire 63 connecting the solenoid 56 to a suitable source of electrical energy (not shown). The leading out wire 18 is also connected to the same source of electrical energy and also to the leading out wire 33, while the leading out wire 39 of the thermostat is connected to the solenoid 56. Where the wires 17, 18, 33 and 39 extend out of the intermediate casing 20 there is a suitable insulator 64 supported either by the platform 4 or the insulated wall of the casing 20.

In the operation of the water heating apparatus now in use and from which drawings have been made, a circulation of water is established between the reservoir 23, the thermostatic chamber 28 and the heating chamber of the inner shell 7 by the pipes 26, 49, 50 and 53, and as long as water within the reservoir 23 is at a predetermined temperature, determined at the dial 44, the switch 55 is open; but immediately upon the temperature of the water falling below the predetermined temperature, caused by incoming cold water, the switch is closed to establish an electric circuit including the heating units 15 and the water about the tubes 13 will be heated until the thermostatic member 29 breaks the electric circuit of the solenoid 56 and permits the expansive force of the spring 57 to open the switch 55.

I attach considerable importance to the fact that the cold water inlet pipe 25 is in proximity to the pipe 26 communicating with the thermostatic chamber 28, as it will be necessary for the water within the reservoir 23 to reach a predetermined temperature before the thermostat will open the switch. In this manner there will be a constant supply of warm water within the reservoir 23 ready for instant use.

Since the inner shell 7 is in spaced relation to the outer shell 8 there is a gap in which air may be heated from the inner shell 7 and this warm air being trapped about the reservoir 23 will cooperate with the insulation material of the apparatus in heating the reservoir 23 and pipes connecting said reservoir to the lower part of the apparatus. At least, there will be no waste of heat from the apparatus and in this manner the heating apparatus may be electrically operated at a minimum expense.

The thermostat shown has been found efficient in connection with the apparatus, but I do not care to confine myself to this one type of thermostat nor to any particular type of heating unit. Other changes may be made without departing from the scope of the appended claims.

What I claim is:—

1. An electric water heating apparatus comprising a shell in which water may be electrically heated, electric heating units in said shell, a reservoir about said shell provided with water inlet and outlet pipes, connecting pipes establishing communication between said shell and reservoir, and a chamber between said shell and reservoir to permit of access being had to said connecting pipes and the electrical connections to said electrical heating units.

2. An electric water heating apparatus comprising a shell in which water may be electrically heated, a reservoir communicating with said shell and provided with water inlet and outlet pipes, a thermostat housing against said shell and communicating with said reservoir and the bottom of said shell with such communication established in alinement with the water inlet pipe of said reservoir, and a thermostat associated with said thermostat housing and controlling the heating of water in said shell.

3. An electric water heating apparatus comprising a shell in which water may be electrically heated, a reservoir communicating with said shell and provided with water inlet and outlet pipes, communicating insulated casings enclosing said reservoir and shell and affording an air chamber heated from said shell, a thermostat housing against said shell and communicating with said reservoir and the bottom of said shell, and a thermostat associated with said thermostat housing and controlling the heating of water in said shell.

4. An electric water heating apparatus comprising superposed insulated casings, a reservoir in the uppermost casing and provided with water inlet and outlet pipes, a shell in the lowermost casing and in which water may be heated, a thermostatic housing set in the lowermost casing against the shell therein, drain pipes establishing communication between the bottoms of said housing and shell, pipes establishing communication between the tops of said housing and shell and said reservoir, a thermostat at said housing, and a switch controlled by said thermostat and adapted to control the heating of water in said shell.

5. An electric water heating apparatus as in claim 4, characterized by said shell containing heating units and a filler member, said units and member being arranged so that small bodies of water will be maintained at said heating units.

6. An electric water heating apparatus wherein a predetermined temperature of water is automatically maintained in a reservoir and a water circulation established between the reservoir and a water heating chamber:—a shell providing such heating chamber, electric heating units in said shell and a filler member in said shell maintaining small bodies of water at said heating units.

7. An electric water heating apparatus as in claim 6 wherein the electric heating units are longitudinally disposed and circumferentially arranged in said shell with said filler member disposed axially thereof.

8. An electric water heating apparatus as in claim 6, and an insulated casing maintaining an air chamber about said casing.

9. An electric water heating apparatus as called for in claim 1, wherein one of said connecting pipes is in alinement with the water inlet pipe of said shell.

10. An electric heating apparatus comprising a shell in which water may be electrically heated, longitudinally disposed electric heating units in said shell, a reservoir above said shell, a water inlet pipe connected to the bottom of said shell axially thereof and extending outside of said shell to said reservoir and a water outlet pipe extending into said reservoir from the top of said shell and axially thereof.

11. An electric water heating apparatus as called for in claim 10, and a housing interposed in the line of said water inlet pipe against said shell, and a thermostat in said housing.

12. A water heating apparatus comprising a lower part for the heating of water, an upper part for the storage of water, said upper and lower parts having pipe connections, and a chamber between the upper and lower parts of said apparatus to permit of access to said pipe connections.

13. An electric water heating apparatus comprising a lower part for the heating of water, an upper part for the storage of water, a chamber between said parts, a water supply pipe extending into the upper part of said apparatus and in proximity to the bottom of said upper part, a pipe connecting the bottom of said upper part to the bottom of said lower part and extending through said chamber, a pipe connected to the top of said lower part and extending through said chamber into the upper part and in proximity to the top of said upper part, and an outlet pipe for said upper part, said chamber permitting of access being had to the pipes between the upper and lower parts of said apparatus.

14. An electric water heating apparatus as called for in claim 13, and electrical connections extending into said chamber and the lower part of said apparatus.

In testimony whereof I affix my signature in presence of two witnesses.

HERBERT W. CHRISTIAN.

Witnesses:
ANNA M. DORR,
KARL H. BUTLER.